US006449651B1

(12) United States Patent
Dorfman et al.

(10) Patent No.: US 6,449,651 B1
(45) Date of Patent: Sep. 10, 2002

(54) SYSTEM AND METHOD FOR PROVIDING TEMPORARY REMOTE ACCESS TO A COMPUTER

(75) Inventors: Alexander Dorfman, Brea; Jeffrey Wayne Pence, Fullerton, both of CA (US)

(73) Assignee: Toshiba America Information Systems, Inc., Irvine, CA (US)

(*) Notice: Subject to any disclaimer, the term of this patent is extended or adjusted under 35 U.S.C. 154(b) by 0 days.

(21) Appl. No.: 09/196,011

(22) Filed: Nov. 19, 1998

(51) Int. Cl.[7] ............................................. G06F 15/16
(52) U.S. Cl. .................... 709/229; 709/219; 709/203; 709/237; 713/150; 380/259; 235/382
(58) Field of Search ................................ 709/302, 219, 709/237, 229; 705/910; 380/255, 259; 713/150, 155, 176, 178, 201; 235/380, 382

(56) References Cited

U.S. PATENT DOCUMENTS

| | | | | |
|---|---|---|---|---|
| 4,679,236 A | * | 7/1987 | Davies | 380/23 |
| 5,120,939 A | * | 6/1992 | Claus et al. | 235/382 |
| 5,377,268 A | * | 12/1994 | Hunter | 380/23 |
| 5,386,369 A | | 1/1995 | Christiano | 364/464.01 |
| 5,434,397 A | * | 7/1995 | Diehl et al. | 235/380 |
| 5,452,357 A | * | 9/1995 | Naccache | 380/25 |
| 5,598,476 A | * | 1/1997 | LaBarre et al. | 380/23 |
| 5,619,571 A | * | 4/1997 | Sandstrom et al. | 380/4 |
| 5,758,069 A | | 5/1998 | Olsen | 395/187.01 |
| 5,943,423 A | * | 8/1999 | Muftic | 380/25 |
| 6,009,417 A | * | 12/1999 | Brookner et al. | 705/410 |
| 6,052,468 A | * | 4/2000 | Hillhouse | 380/281 |
| 6,075,860 A | * | 6/2000 | Ketcham | 380/25 |
| 6,101,606 A | * | 8/2000 | Diersch et al. | 713/201 |

OTHER PUBLICATIONS

Microsoft Press, "Windows NT Resource Guide", Publish by Microsoft Press, 1993, pp. 843–861.*
Dreifus et al, "SmartCard" Publish by John Wiley & Sons, Oct. 1998, Chapter 8, pp. 1–2 and Chapter 12, pp. 1–6.*

* cited by examiner

Primary Examiner—John Breene
Assistant Examiner—Khanh Pham
(74) Attorney, Agent, or Firm—Morrison & Foerster LLP

(57) ABSTRACT

A system and method for providing temporary access to a host computer from a remote computer. The host computer maintains a system date and time and is connected to the remote computer over a communications link. The system includes a first dongle and a second dongle. The first dongle is adapted to be connected to a parallel port of the host computer, and includes a first program memory for storing an encryption algorithm and a temporary memory for storing a key for use with the encryption algorithm. A second dongle is adapted to be connected to the remote computer, and includes a second program memory for storing a copy of the encryption algorithm and a non-volatile memory for storing a copy of the key for use with the copy of said encryption algorithm. A date range is stored in the non-volatile memory of the second dongle and includes a starting date on which temporary access will begin, and an ending date for the temporary access. The second program memory also includes program logic to deactivate the second dongle when the second dongle is accessed by the remote computer on a date outside of the date range.

4 Claims, 6 Drawing Sheets

SYSTEM AND METHOD FOR PROVIDING TEMPORARY REMOTE ACCESS TO A COMPUTER

BACKGROUND OF THE INVENTION

1. Field of the Invention

The present invention relates to restricting access to computers and more particularly to a system and method for providing temporary remote access to a computer.

2. Description of Related Art

Businesses today typically store information on file servers connected to local area networks in their respective places of business. Employees connected to a local area network can gain access to information on a local file server if certain security criteria is met. For example, a traditional form of security requires the user to enter a username and password to authenticate the identity of the user. An employee entering his or her username and password will likely have read and write access to certain groups of files and read access to certain additional files on the file server. The typical user thus has limited access to files, and further cannot gain access to administrative facilities for the configuration and maintenance of the file server, which are usually reserved for a system administrator.

Through the proliferation of wide area computer networks, extranets, the Internet, and other forms of remote computer access, a computer user can log into a local area network from a remote location and access and/or destroy files on the file server. Although remote access to a computer network provides many advantages for a business, it also leaves the business more vulnerable to unauthorized and possibly destructive use of their computers.

Similar to the protocol used in a local area network, computer security for remote users is generally accomplished through the use of a username/password combination that uniquely identifies the user. Although virtually any combination of letters and numbers can be utilized for usernames and passwords, the use of a username/password combination provides a low level of security. Usernames on a network generally have a fixed format (e.g., first initial and first 7 letters of the user's last name) and are often equivalent to an email address. In addition, user's typically select passwords that are easy to remember such as the names of children or pets. An unscrupulous hacker can often guess a username/password combination with minimal information about the user, or can acquire the username/password combination by "eavesdropping" on the communications link between the remote computer and the network.

Another method for restricting access to a computer network involves the use of hardware tokens or dongles that must be physically connected to a remote user's computer before access will be granted. The server can be programmed to periodically check that a particular hardware device is connected to the remote computer, and terminate the remote access if the hardware device is not present. These hardware devices generally include username/password information or other information, such as a serial number, that can be used to identify the presence of the correct hardware device. Some drawbacks with these hardware devices include the difficulty of changing a user password, and in the case where the hardware device is lost or stolen, the ease at which a new owner can gain access to the system.

Despite the aforementioned problems, the use of a username/password combination and/or the use of hardware devices provides sufficient protection for most businesses. The information stored on a file server is often "backed-up" on a daily basis, and if an unauthorized user (i.e., "hacker") is able to gain access to the computer system, the hacker will likely have limited access to files (e.g., only have access to the files of a single user), thus exposing the company to minimal risk. An extra level of security may also be added for high-level passwords to prevent their use from remote locations. For example, the system administrator who must perform maintenance or administrative functions may be required to access the computer network through a computer terminal that is physically connected to the file server—e.g., a terminal in the same room as the file server. As discussed above, a system administrator can have virtually unlimited access to the computer system through a username/password that provides access to system administration, configuration, and maintenance functions, as well as access to all of the files stored on the file server. Because a potential hacker must be physically in the room to gain access, hacking into the system from a remote location as a system administrator would be nearly impossible.

When a computer network requires maintenance, troubleshooting or a software upgrade, the manufacturer or vendor may need access the computer network as a high-level user, such as a system administrator. With fast speed modems and dedicated communications links, it is often beneficial to access the computer networks remotely to perform the necessary maintenance. As discussed above, if a standard username and password are used, the entire computer system can be made vulnerable to hackers. Although a hardware token or dongle can be used to restrict access, if such a hardware device is lost or stolen, it could provide an unauthorized user with unrestricted access to the computer network. Because such maintenance is temporary in nature, there exists a need in the art for a system and method for providing secure temporary access to a computer system from a remote location.

SUMMARY OF THE INVENTION

The present invention satisfies a need in the art by providing a system and method for providing secure temporary access to a computer system from a remote location through the use of a perishable password.

In one embodiment of the present invention, a method for providing temporary remote access to a host computer from a remote computer is provided. First, a dongle is provided, which includes a processor, a non-volatile memory, and a program memory for storing program logic for controlling the processor. A date range is selected, including a starting date and time for the temporary remote access and an ending date and time for the temporary remote access, and stored in the non-volatile memory of the dongle. The dongle is then connected to the remote computer.

Through the remote computer, a communications link is established with the host computer, such as through a direct telephone connection or over the Internet. The host computer will grant remote access to the remote computer only if a system date from the host computer is within the date range stored in the non-volatile memory of the dongle connected to the remote computer. To ensure that remote access is not granted outside of the date range stored in the dongle, the dongle is deactivated if the remote computer attempts to access the host computer when the system date is outside of the date range.

The method may further include selecting an encryption key and storing the encryption key in the non-volatile memory of the dongle. The dongle further includes an encryption algorithm which can be used to encrypt a seed in accordance with the encryption key. Before allowing remote access, the validity of the encryption key is determined. If the encryption key is invalid, remote access to the host computer will not be granted.

In addition, a second dongle may also be provided, including a second processor, a second program memory for storing program logic for controlling the second processor and a second non-volatile memory. The second program memory includes a copy of the encryption algorithm stored in the first dongle. A copy of the encryption key is also stored in the second non-volatile memory. The second dongle is then connected to the host computer. Access to the host computer will only be granted if the encryption key in the dongle connected to the remote computer is equal to the copy of the encryption key stored in the second dongle connected to the host computer.

One way to verify that the encryption keys are identical is through the encryption algorithm. The host computer selects a unique seed and transmits the unique seed and the system date to the remote computer over the communications link. If the system date is within the date range stored in the non-volatile memory of the dongle, then the unique seed is encrypted by the encryption algorithm in accordance with the encryption key and provided to the remote computer. Otherwise, the encryption key is altered and the unique seed is encrypted using the altered encryption key, thus producing an invalid encryption result. The encrypted result is then transmitted to the host computer. The host computer performs its own encryption of the unique seed through the second dongle which utilizes the encryption algorithm stored in the second dongle in accordance with the stored copy of the encryption key to return to the host computer a second encrypted result. The host computer then compares the encrypted result received from the remote computer to the second encrypted result, and allows the remote computer to access the host computer only if the two results are equal. While the remote computer is accessing the host computer, the host computer may periodically verify that the dongle is still connected to the remote computer by rechecking the encryption key in the dongle.

Further, an access counter may also be included to limit the number of remote accesses available for the dongle. A number of allowable remote accesses is selected and stored in the access counter of the dongle connected to the remote computer. Each time an attempt is made to access the host computer, the access counter is decremented by one. Remote access to the host computer will be denied if the access counter equals zero. For example, the dongle may include logic to alter the encryption key when the access counter equals zero.

In another embodiment of the present invention, a system for providing temporary access to a host computer from a remote computer is provided. The host computer maintains a system date and is connected to the remote computer through a communications link, such as the Internet. The system includes a first dongle and a second dongle. The first dongle is adapted to be connected to the host computer, and includes a first program memory for storing an encryption algorithm and a temporary memory for storing an encryption key for use with the encryption algorithm. The second dongle is adapted to be connected to the remote computer, and includes a second program memory for storing a copy of the encryption algorithm and a non-volatile memory for storing a copy of the encryption key for use with the copy of the encryption algorithm. The copy of the encryption key cannot be read by the remote computer without an access key to the dongle; the access key is not provided to the remote user in the preferred embodiment.

A date range is stored in the non-volatile memory of the second dongle, and includes a starting date and time for the temporary access and an ending date and time for the temporary access. The second program memory further includes program logic for altering the copy of the encryption key in the non-volatile memory of the second dongle when an attempt is made to access the host computer on a date outside of the date range.

The system may also include a computer-readable storage media. In one embodiment, a first computer-readable storage medium includes program logic for controlling the host computer to perform the steps of: waiting for the remote computer to request access to the host computer; transmitting the system date to the remote computer; selecting a unique seed and transmitting the seed to the remote computer; encrypting the seed through the first dongle to receive a first encrypted value; receiving a second encrypted value from the remote computer; and comparing the first encrypted value with the said second encrypted value, and allowing the remote computer to access the host computer only if the first and second encrypted values are equal.

A second computer-readable storage medium may be provided and may include program logic for controlling the remote computer to perform the steps of: requesting access to the host computer; receiving the seed and system date from the host computer; instructing the second dongle to encrypt the seed in accordance with the copy of the encryption algorithm and encryption key stored in the dongle, thereby obtaining a second encrypted value; and transmitting the second encrypted value to the host computer.

A more complete understanding of the System and Method for Providing Remote Access to a Computer will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need in the art for secure, temporary remote access to a computer system, by providing a system and method for implementing a perishable password—i.e., a password that expires. In the detailed description that follows, it should be appreciated that like element numerals are used to describe like elements that are illustrated in one or more of the figures.

Figure 1:
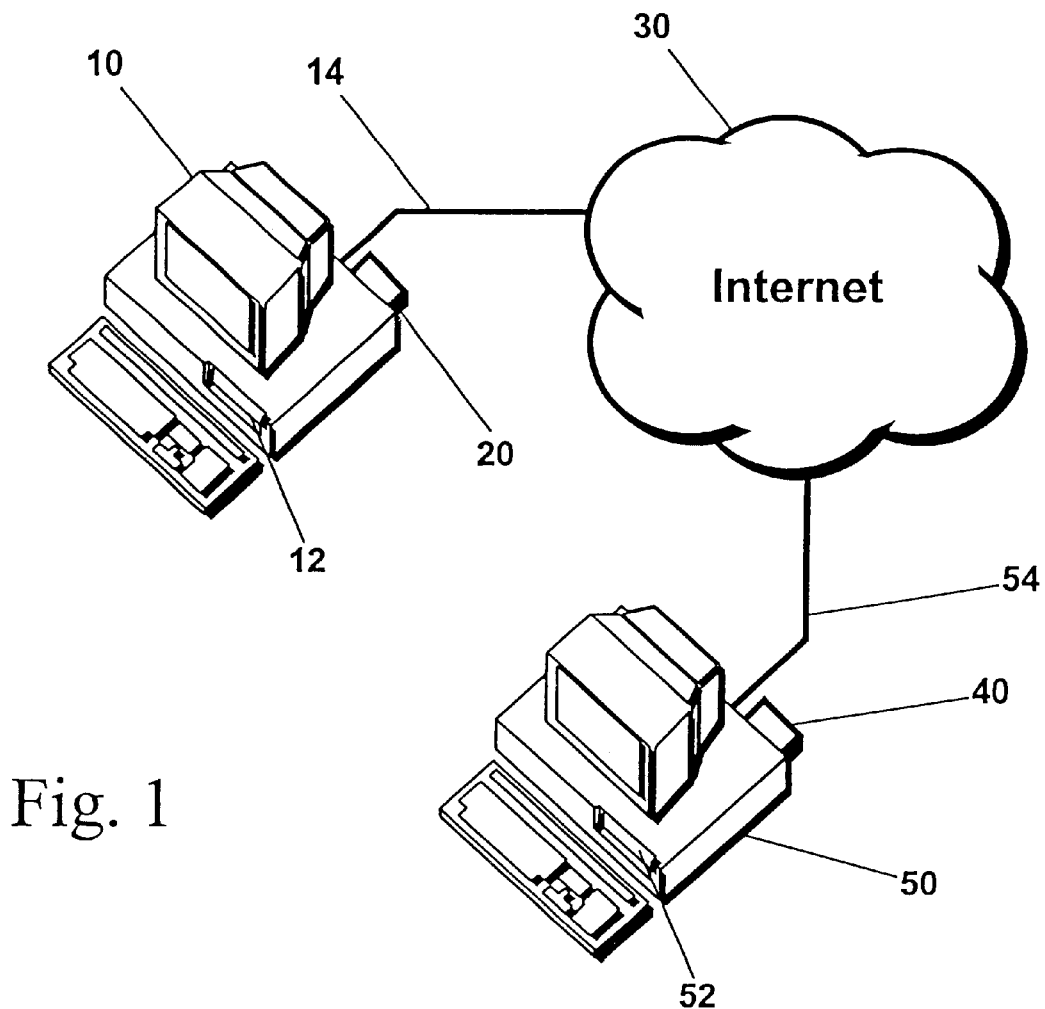
FIG. 1 illustrates a system in accordance with a preferred embodiment of the present invention.

A preferred embodiment of the present invention will now be described with reference to FIG. 1. A host computer 10 includes a computer-readable storage medium 12 and is connected to a communications line 14, such as a telephone line or an ISDN line for connecting the host computer 10 to the Internet 30. As illustrated, the host computer 10 is personal computer having a display device and an input device, and also includes the standard components of a personal computer, including a memory and a processor. It should be appreciated that the host computer 10 may be a network server controlling a local area network, an e-mail server, an Internet web-server or any other computer capable of being accessed from a remote location over the communications line 14. In addition, the computer readable storage medium 12 is illustrated as a floppy disk, but the computer readable storage medium 12 may also be a hard disk drive, a CD-ROM drive, a random access memory or any other computer-readable storage media as known in the art.

A remote computer 50 includes a computer-readable storage medium 52 and a communications line 54, such as a telephone line or an ISDN line for connecting the remote computer 50 to the Internet 30. As illustrated, the remote computer 50 is a personal computer having a display device and an input device, and also includes the standard components of a personal computer, including a memory and a processor. Through the communications lines 14 and 54, and the Internet 30, a communications link can be established between the host computer 10 and the remote computer 50. It should be appreciated that a communications link between the host computer 10 and remote computer 50 may also be established in other ways, such as through direct telephone communication.

In accordance with the preferred embodiment of the present invention, a pair of dongles 20 and 40 are provided. When remote maintenance is required on the host computer 10, a temporary password may be provided to the remote user in the form of the dongle 40. The dongle 40 must be connected to the remote computer 50 in order for the remote computer 40 to gain access to the host computer 10. The dongle 40 includes a perishable password—i.e., the password becomes "ripe" at a certain time and will "expire" after a certain time—thus, if the dongle 40 is lost or stolen, the dongle 40 can only be used to access to the host computer 10 within a small window of time. To provide an added layer of protection, the dongle 20 corresponding to the dongle 40 may be connected to the host computer 10. In this configuration, in order for the remote computer 50 to access the host computer 10, both dongles 40 and 20 must be connected to their respective computers.

Figure 2:
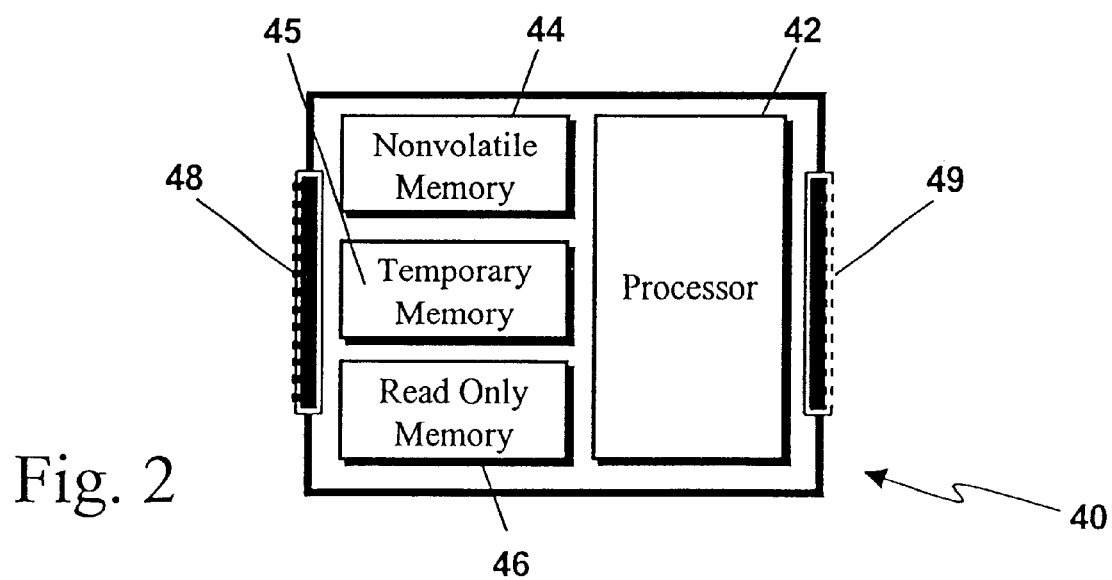
FIG. 2 is a block diagram illustrating the components of a preferred embodiment of a dongle.

A preferred embodiment of the dongle 40 will now be described in greater detail with reference to the block diagram of FIG. 2. As illustrated, the dongle 40 is a microcontroller that includes a processor 42, a non-volatile memory 44, a temporary random access memory 45 and read-only memory 46. The read-only memory 46 includes program logic for controlling the processor 42, such as an encryption algorithm for encrypting a seed input to the dongle 40, and an algorithm for decrementing an access counter stored in the non-volatile memory 44 each time the dongle is utilized to access the host computer. A pair of connectors 48 and 49 are also provided. The connector 48 is a male connector adapted to connect to a parallel port of the remote computer 50. The connector 49 is a female connector adapted to connect to another parallel compatible connector such as a printer cable. The dongle 40 communicates with the remote computer 50 through the connector 48. It should be appreciated that the dongle 20 may include components that correspond with those of the dongle 40.

Figure 3:
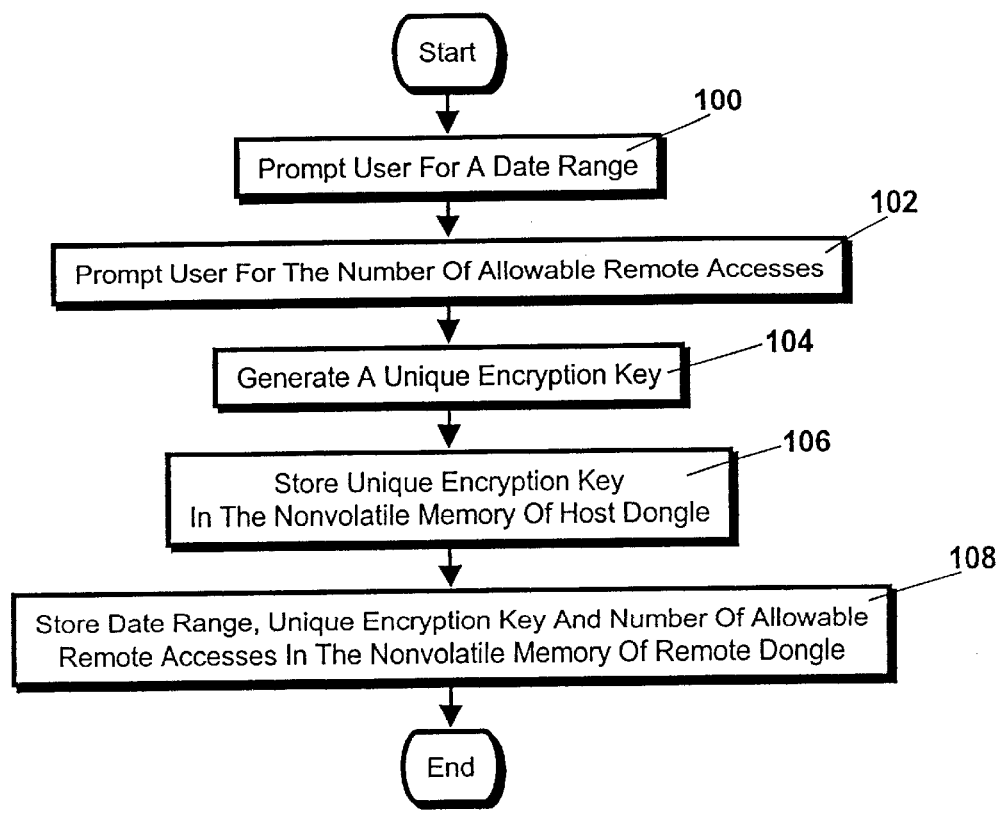
FIG. 3 is a flow diagram illustrating the steps for initializing a pair of dongles.

The general operation of the preferred embodiment will now be described with reference to the flow diagrams of FIGS. 3–6, with reference to FIGS. 1–2. The flow diagram of FIG. 3 illustrates the steps for creating the perishable password of the preferred embodiment, and are executed by a password administrator operating a personal computer. In the preferred embodiment, the perishable password is created by a manufacturer of the host computer 10 and subsequently issued to the remote user and the administrator of the host computer 10. To create a perishable password that utilizes two dongles, the password administrator must possess the dongles 20 and 40, along with program logic for writing to the dongles 20 and 40 respectively, and an access key for each dongle. Generally, the access key is a password stored in the memory of the dongle that must be known before certain read and write access to the non-volatile memory of the dongle is granted. As known in the art, dongle manufacturers typically provide proprietary software for their dongles which can be utilized to store data in the dongle's non-volatile memory, provided an access key for the dongle is known.

The password administrator is prompted by the personal computer at step 100 to enter a date range into the personal computer representing the dates and times in which the perishable password should be valid. For example, if maintenance is to be performed over an upcoming weekend, the perishable password could be set to activate on Saturday morning and deactivate on Sunday evening. Next, at step 102, the password administrator is prompted by the personal computer to enter the number of remote accesses that the dongle will permit. At step 104, the personal computer generates a unique encryption key to be utilized by the encryption algorithm stored in the read-only memory of each dongle. Methods for generating unique encryption keys are known in the art, and proprietary software provided by the dongle manufacturer will typically include such an algorithm for generating a unique encryption key compatible with the encryption algorithm utilized by the dongle.

Next, at step 106, the password administrator is prompted to connect the host dongle 20 to the parallel port of the personal computer. The unique encryption key is then stored in the non-volatile memory 44 of the host dongle 20. To maintain the secrecy of the unique encryption key, it is stored with a flag that is set such that the host dongle 20 will prevent a computer from reading or overwriting the unique encryption key without the access key for the host dongle 20. It is noted, however, that the host dongle 20 will have both read and write access to the non-volatile memory. Next, the password administrator is prompted to disconnect the host dongle 20 and connect the remote dongle 40 to the parallel port of the personal computer. The date range, unique encryption key, and number of allowable accesses (i.e., an access counter) are then stored in the non-volatile memory 44 of the remote dongle 40. To preserve the secrecy of the unique encryption key and the access counter, both are stored with a flag that is set such that the remote dongle 40 will prevent a computer from reading or overwriting either the unique encryption key or the access counter without the access key for the remote dongle 40. In the preferred embodiment, the date range is stored with a flag that is set such that the remote dongle 40 will allow a computer to read the date range from the non-volatile memory; however, a computer will not be able to overwrite the date range without the access key for the remote dongle 40. The host dongle 20 may then be connected to the parallel port of the host computer 10, and the remote dongle 40 connected to the parallel port of the remote computer 50, to allow the remote computer 50 to temporarily access the host computer 10. In an alternate embodiment, the date range and number of allowable accesses may also be stored in the host dongle 20, to provide an additional layer of security. Also, it is contemplated that, in alternate embodiments, the date range may be stored in the remote dongle 40 with the flag set to prevent a computer from reading the date range.

A preferred embodiment of the operation of the dongle 40 will now be described with reference to the flow diagrams of FIGS. 4a–c, with reference to FIG. 2. The ROM 46 of the dongle 40 includes program instructions for controlling the processor 42, such as controlling the I/O to and from the dongle 40 and processing certain commands received from the remote computer 50. For example, as discussed above, the ROM 46 may include logic for writing to the non-volatile memory 44 when requested by the remote computer, provided that the access key for the dongle 40 is received from the remote computer 50. Three other functions stored in the ROM 46 of the preferred embodiment are illustrated in the flow diagrams of FIGS. 4a–c, respectively.

Figure 4A:
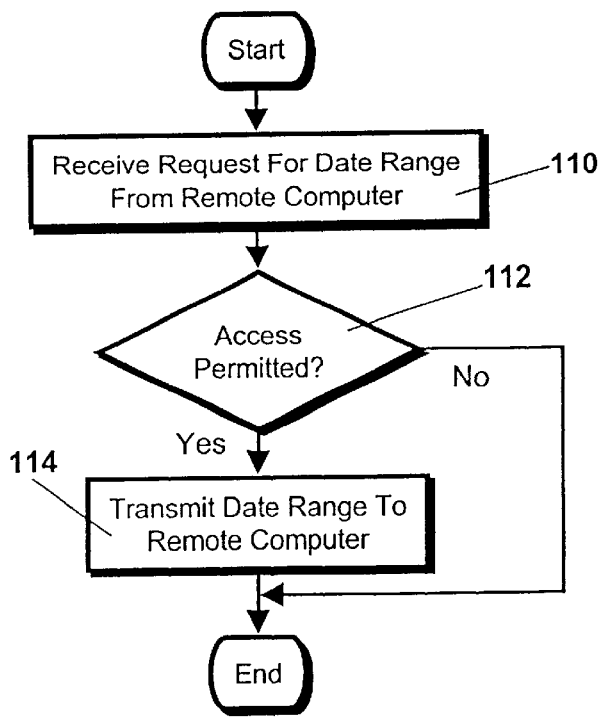
FIGS. 4a–c are flow diagrams illustrating a preferred embodiment of the basic program logic executed by the dongle connected to the remote computer.

The flow diagram of FIG. 4a illustrates the logic executed by the dongle 40 in response to a request from the remote computer 50 for the date range stored in the non-volatile memory 44. At step 110, the dongle 40 receives the request for the date range from the remote computer 50. As discussed above, a flag is stored with the date range in the non-volatile memory 44 to indicate whether the remote computer 50 can read the date range without the access key for the dongle. The flag is checked at step 112, and if read access is permitted, the dongle 40 transmits the date range to the remote computer 50 at step 114.

After receiving the date range from the dongle 40, the remote computer 50 compares a system date to the date range. If the system date is outside of the date range, the remote computer 50 sends a command to the dongle 40 that disables the temporary password. The flow diagram of the FIG. 4b illustrates the logic executed by the dongle 40 in response to such a command. At step 116, the dongle 40 receives the instruction from the remote computer 50 that the password has expired. The dongle 40 then sets the access counter equal to '0' and alters the encryption key. Because the access counter retains the number of login attempts available with the dongle 40, setting the access counter to zero disables its further use for gaining remote access to the host computer. In addition, altering the encryption key will result in the encryption algorithm from the dongle 40 producing invalid encryption values.

If the system date is within the date range, the remote computer 50 may transmit a command to the dongle 40 to encrypt a seed. As will be discussed in greater detail below, the encrypted seed is utilized by the host computer 10 to determine whether to grant remote access to the remote computer 50. The flow diagram of the FIG. 4c illustrates the logic executed by the dongle 40 in response to an encrypt command. At step 122, the dongle 40 receives the encrypt command along with a seed to be encrypted. The seed is then encrypted at step 124 with the encryption algorithm stored in the ROM 46 and the encryption key stored in the non-volatile memory 44. If the system date is outside the date range or the access counter is equal to zero, an invalid encryption key will be used to encrypt the seed, thus producing an invalid result. The value of the access counter stored in the non-volatile memory 44 is then checked at step 126. If the access counter is equal to zero, then the encrypted seed is transmitted to the remote computer at step 134. Otherwise, if the access counter is greater than 0, the access counter is decremented by '1' at step 128. At step 130, the access counter is again checked, and if the access counter equals zero (i.e., this is the last authorized login attempt available on the dongle 40) then the encryption key is altered at step 132 so that future encryptions will produce invalid results. The encrypted seed is then transmitted to the remote computer 50 at step 134.

Figure 4B:
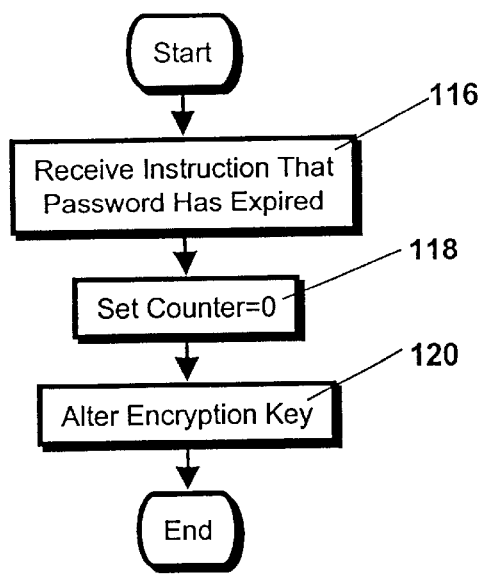
Figure 4C:
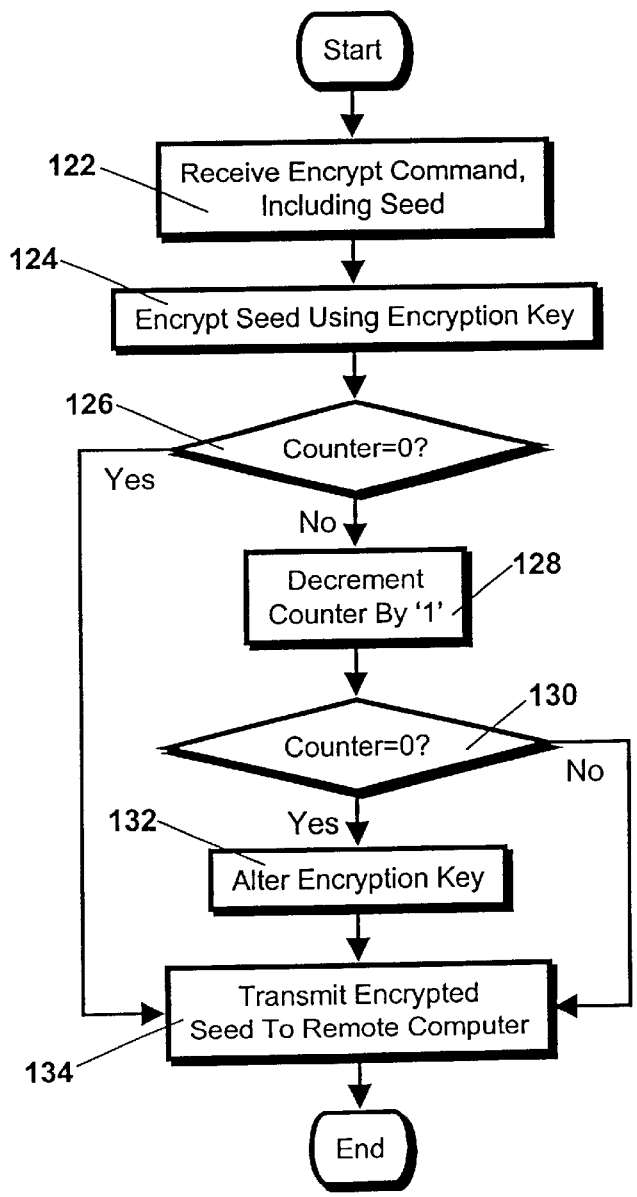
Figure 4D:
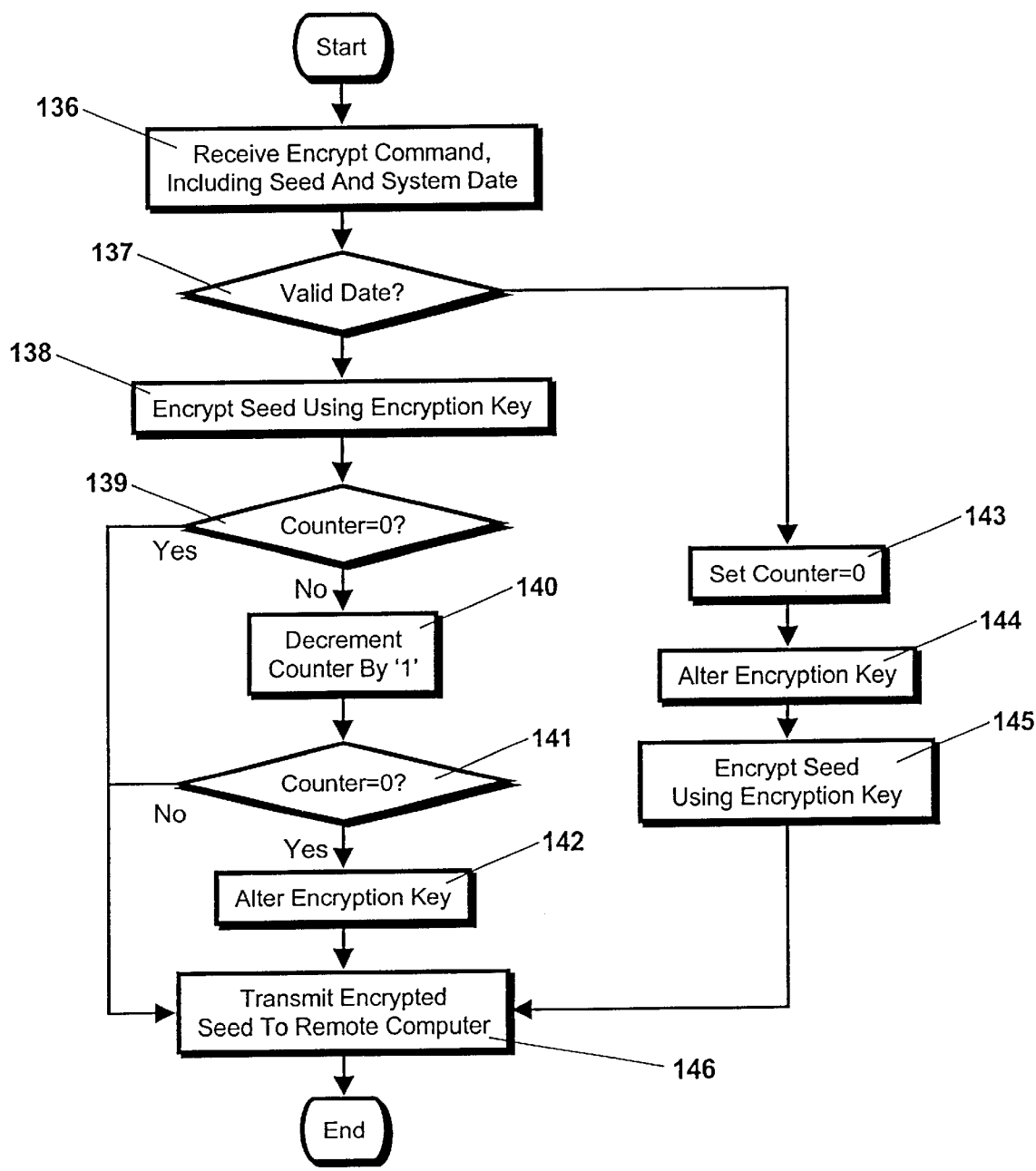
FIG. 4d is a flow diagram illustrating an alternate embodiment of the basic program logic executed by the dongle connected to the remote computer.

It should be appreciated that the ROM 46 may include logic for performing additional functions, and that one or more of the functions illustrated in FIGS. 4a–c could be combined into a single function call. For example, it is contemplated that the dongle 40 may perform the comparison between the system date and the date range, and that the logic from FIGS. 4a–c may be combined into a single function as illustrated in the flow diagram of FIG. 4d. At step 136, the dongle 40 receives the system date and seed from the remote computer 50. The dongle 40 can receive this information in the form of a function call including the system date and seed as function parameters. The processor 42 then compares the system date provided by the remote computer 50 to the date range stored in the non-volatile memory 44 at step 137. If the system date is valid, i.e., within the date range, then at step 138 the seed is encrypted in accordance with the encryption key stored in the non-volatile memory 44 and the encryption algorithm stored in the ROM 46.

The value of the access counter is then checked at step 139. If the access counter does not equal zero, then remote accesses allocated to the dongle 40 are still available, and the access counter is decremented by '1' at step 140. The value of the access counter is checked again at step 141, and if the value is zero, the encryption key is altered so that the next attempt to encrypt a seed through the dongle 40 will produce an invalid result. Referring back to step 137, if the system date is not in the date range stored in the non-volatile memory, then the password has expired and the dongle 40 will be deactivated. At step 143, the access counter is set to zero and at step 144, the encryption key is altered so that further attempts to encrypt using the dongle will produce invalid results. The seed is then encrypted at step 145 using the altered encryption key, thus producing an invalid encryption result. The dongle 40 will then return the encrypted seed to the remote computer 50 at step 146.

Figure 5:
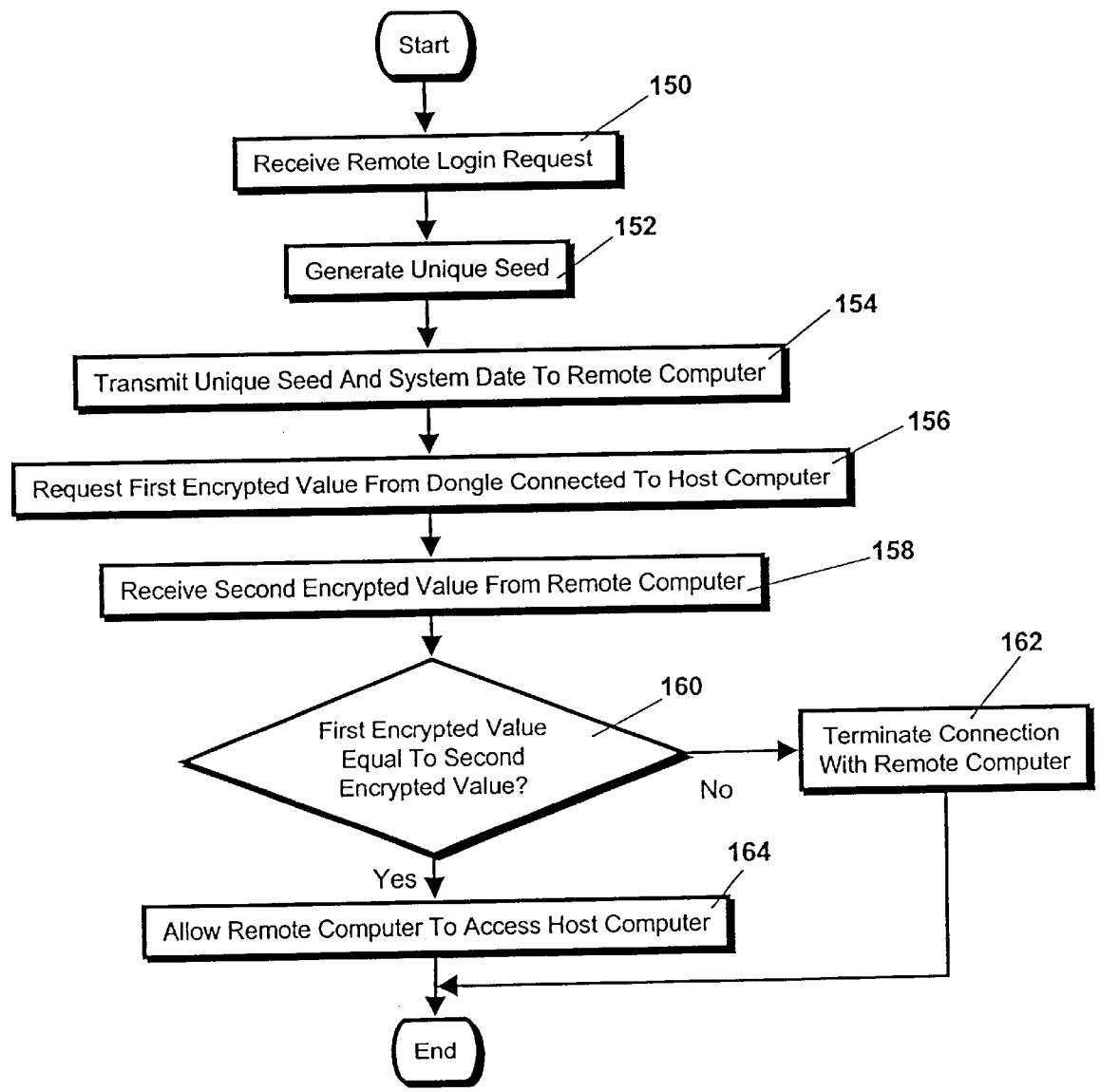
FIG. 5 is a flow diagram illustrating a preferred embodiment of program logic executed by the host computer.

Operation of the host computer 10 will now be described with reference to the flow diagram of FIG. 5 which illustrates a preferred embodiment of the program logic stored in the computer-readable storage medium 12 of the host computer 10. At step 150, the host computer 10 receives a login request from the remote computer 50. At step 152, the host computer 10 generates a unique random seed to be encrypted by the encryption algorithm stored in the dongles 20 and 40. The host computer 10 then transmits the unique seed and the system date of the host computer 10 to the remote computer 50 at step 154.

The host computer 10 encrypts the unique seed at step 156 by sending a function call to the dongle 20 connected to the host computer 10, including the unique seed as a parameter. The dongle 20 then returns a first encrypted value to the host computer 10. At step 158, the host computer 10 receives a second encrypted value from the remote computer 50. At step 160, if the first encrypted value is equal to the second encrypted value, then the host computer 10 grants access to the remote computer 50 at step 164. If the first encrypted value is not equal to the second encrypted value, then the connection between the host computer 10 and the remote computer 40 is terminated—i.e., the remote computer is denied remote access to the host computer. It should be appreciated that the encrypted values may by unequal for a variety of reasons, for example, the system date may be outside of the stored date range, the number of remote accesses available on the dongle 40 may be zero, the dongle 20 and the dongle 40 may have different unique encryption keys stored in their respective non-volatile memories, etc. It is also contemplated that the host computer 10 may repeat steps 152–164 periodically while the remote computer 50 is accessing the host computer 10, to verify that the remote computer 50 is still attached to the dongle 40.

Figure 6:
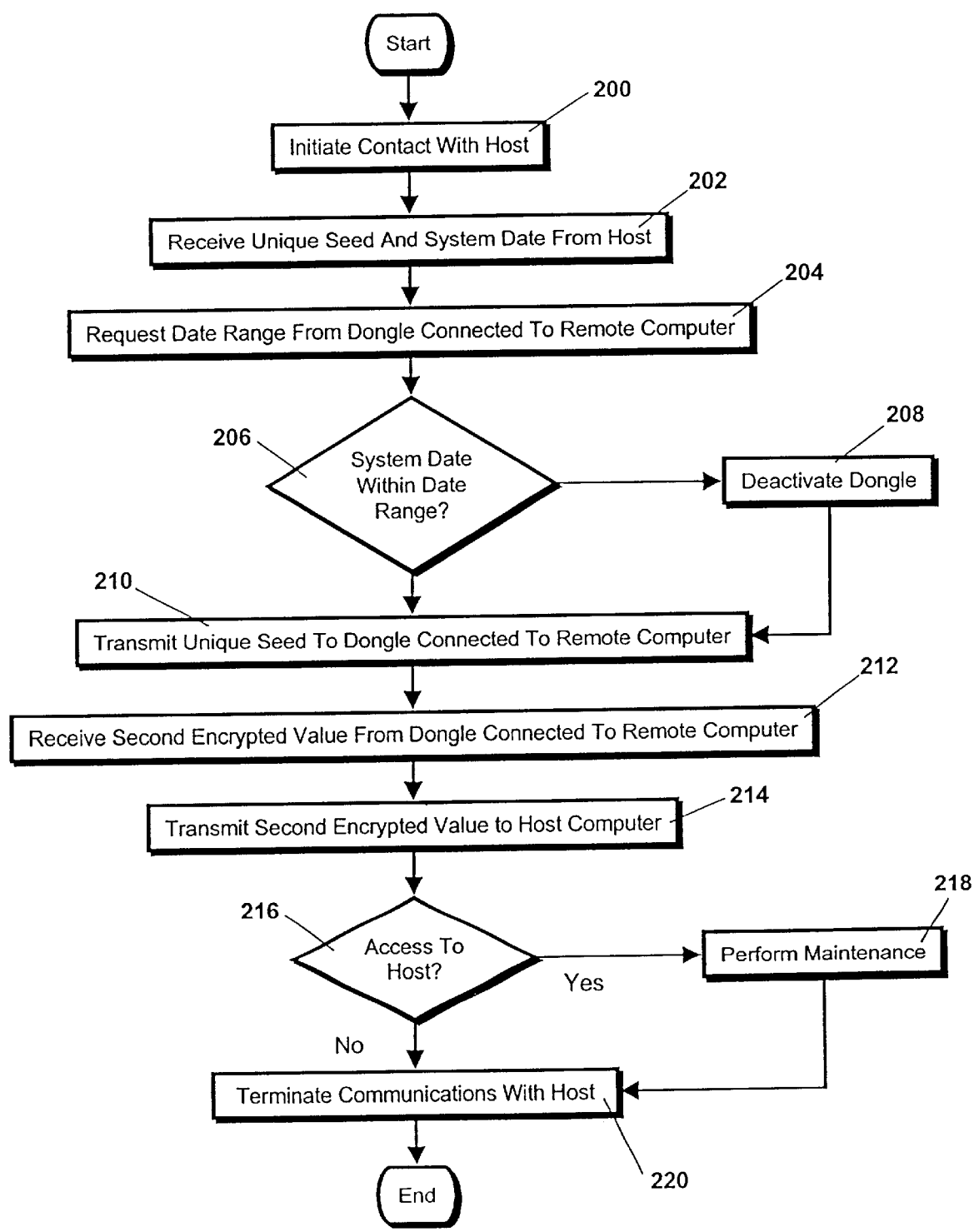
FIG. 6 is a flow diagram illustrating a preferred embodiment of program logic executed by a remote computer.

Operation of the remote computer 50 will now be described with reference to the flow diagram of FIG. 6. The program logic from FIG. 6 illustrates a preferred embodiment of the program logic stored in the computer-readable storage medium 52, and is compatible with the preferred embodiment of the program logic for the dongle 40 illustrated in FIGS. 4a–c. At step 200, the remote computer 50 initiates a communications link with the host computer 10. At step 202, the remote computer receives the unique seed and the system date from the host computer 10. The remote computer 50 then send a function call to the dongle 40 at step 204, requesting the date range stored in the non-volatile memory 44 of the dongle 40. If the system date is within the date range received from the dongle 40, then the password in the dongle 40 is still active. However, if the system date is not within the date range, then the remote computer 50 transmits a command to the dongle 40 instructing the dongle 40 to deactivate the password at step 208.

At step 210, the remote computer 50 instructs the dongle 40 to encrypt the unique seed. The encrypted seed is received from the dongle 40 at step 212 and the remote computer 40 transmits the encrypted seed to the host computer at step 214. As discussed above, the dongle 40 will return either a valid data value, or an invalid data value, depending on the validity of the date range and the value of the access counter. Next, the remote computer 50 waits to receive access to the host computer at step 216. If access to the host computer 10 is granted, then remote maintenance can be performed on the host computer 10 by the remote computer 50 at step 218. If access is not granted, then the communications link with the host computer 10 is terminated at step 220.

Having thus described a preferred embodiment of the Method and Apparatus for Providing Temporary Access to a Computer, it should be apparent to those skilled in the art that certain advantages of the within system have been achieved. It should also be appreciated that various modifications, adaptations, and alternative embodiments thereof may be made within the scope and spirit of the present invention. For example, the date range of the preferred embodiments are illustrated as being stored unencrypted, but it should be apparent that the inventive concepts described above would be equally applicable to a system and method in which the date range is encrypted to provide even greater protection. In addition, as illustrated, the dongle is deactivated by altering the encryption key, but it should be apparent that other methods of deactivation may also be used, such as clearing the date range from the non-volatile memory.

This illustration is presently the best contemplated mode for carrying out the invention. This illustration is made for the purpose of illustrating the general principles of the invention, and is not to be taken in a limiting sense. The scope of the invention is best determined by reference to the following claims.

What is claimed is:

1. A method for providing temporary remote access to a host computer from a remote computer, said method utilizing a dongle adapted to be connected to said remote computer and including a processor, a program memory for storing program logic for controlling said processor, and a non-volatile memory, said method comprising the steps of:

selecting a date range, said date range including an ending date for said temporary remote access;

storing said date range in said non-volatile memory of said dongle;

selecting a number of allowable remote accesses;

storing said number of allowable remote accesses in a counter of said non-volatile memory of said dongle;

connecting said dongle to said remote computer;

decrementing said counter each time an attempt is made to access the host computer from the remote computer;

denying access to said host computer from said remote computer when said counter equals zero;

allowing said remote computer to access system administration, configuration, and maintenance functions of said host computer when a system date from said host computer is within said date range stored in said non-volatile memory of said dongle, without requiring that a password be input; and deactivating said dongle if an attempt is made to access said host computer from said remote computer when said system date is outside of said date range.

2. A system for providing temporary access to system administration, configuration, and maintenance functions of a host computer from a remote computer without requiring that a password be input, said host computer having a system date and being connected to said remote computer through a communications link, said system comprising:

a first dongle adapted to be connected to said host computer, said first dongle including a first program memory for storing an encryption algorithm and a temporary memory for storing an encryption key for use with said encryption algorithm; and a second dongle adapted to be connected to said remote computer, said second dongle including a second program memory for storing a copy of said encryption algorithm and a non-volatile memory for storing a copy of said encryption key for use with said copy of said encryption algorithm and a date range including a starting date for said temporary access and an ending date for said temporary access;

wherein said second program memory further includes program logic to alter said copy of said encryption key when said second dongle is accessed by said remote computer on a date outside of said date range;

wherein said non-volatile memory further includes an access counter for holding a number of allowable remote accesses, wherein said access counter is decremented by one each time that said remote computer accesses said host computer, and wherein remote access to said host computer from said remote computer is granted only if said access counter is greater than zero.

3. The system of claim 2 wherein said access counter is set to zero if said second dongle is accessed by said remote computer on a date outside of said date range.

4. In a computer system comprising a host computer having a system date and a remote computer connected to said host computer through a communications link, a perishable password system for use with said remote computer to provide temporary access to said host computer comprising:

a dongle adapted to be connected to said remote computer, said dongle including a processor, a program memory storing program instructions for controlling said processor, and a non-volatile memory for storing an encryption key and a date range, said date range including an ending date after which said perishable password expires, wherein said program memory includes program instructions for causing said processor to perform the steps of receiving an encryption instruction from said remote computer, said encryption instruction including a seed to be encrypted and a system date of said host computer, comparing said system date to said date range stored in said nonvolatile memory, and altering said encryption key stored in said non-volatile memory if said system date is outside of said date range, encrypting said seed in accordance with said encryption key, thereby producing an encrypted result, wherein said encrypted result is valid if said encryption key is unaltered and said encrypted result is invalid if said encryption key is altered, and transmitting said encrypted result to said remote computer, wherein said remote computer is granted access to system administration, configuration, and maintenance functions of said host computer if said encrypted result is valid, and denied access to said host computer if said encrypted result is invalid, without requiring that an external password be input;

a computer-readable storage medium, including program logic for controlling said remote computer to perform the steps of transmitting a request for remote access to said host computer across said communications link, receiving said seed and said system date from said host computer, instructing said dongle to encrypt said seed, said instruction including said system date, receiving from said dongle an encrypted result, and transmitting said encrypted result to said host computer, wherein said non-volatile memory further includes an access counter for storing a number of allowable remote accesses to said host computer with said dongle; and wherein said program memory further includes program instructions for causing said processor to perform the steps of:

decrementing the access counter by one each time that said remote computer attempts to access said host computer; and altering said encryption key if said access counter equals zero.

* * * * *